United States Patent [19]

Leighou et al.

[11] 4,275,457
[45] Jun. 23, 1981

[54] APPARATUS AND METHOD FOR RECEIVING DIGITAL DATA AT A FIRST RATE AND OUTPUTTING THE DATA AT A DIFFERENT RATE

[75] Inventors: Robert O. Leighou, Lakewood; Leighton A. Meeks, Littleton, both of Colo.

[73] Assignee: Martin Marietta Corporation, Bethesda, Md.

[21] Appl. No.: 87,425

[22] Filed: Oct. 22, 1979

Related U.S. Application Data

[62] Division of Ser. No. 798,187, May 18, 1977, Pat. No. 4,173,014.

[51] Int. Cl.³ .............................................. G11B 5/43
[52] U.S. Cl. ...................................... 364/900; 360/26
[58] Field of Search ........................... 360/26, 27, 70; 235/436, 466; 364/900

[56] References Cited

U.S. PATENT DOCUMENTS

| 3,184,581 | 5/1965 | Willoughby | 360/26 |
|---|---|---|---|
| 3,204,228 | 8/1965 | Eckert | 360/26 |
| 3,394,355 | 7/1968 | Sliwkowski | 360/26 |
| 3,395,399 | 7/1968 | Goodenow | 360/26 |
| 3,702,996 | 11/1972 | Wolfer et al. | 360/26 |
| 3,748,386 | 7/1973 | Monney et al. | 360/26 |
| 3,982,277 | 9/1976 | Naylor | 360/27 |
| 4,024,498 | 5/1977 | McIntosh | 360/26 |
| 4,054,921 | 10/1977 | Tatami | 360/27 |

*Primary Examiner*—Leo H. Boudreau
*Attorney, Agent, or Firm*—Yount & Tarolli

[57] ABSTRACT

A system is disclosed wherein a series bit stream of digital data, at a relatively high bit rate, is received and the data is recorded on a multiple channel recording medium. During the recording of the data, the data is divided into frames of words each having N bits. Each word has a parity bit added so that each word has N+1 bits. In addition, the data for each channel is recorded in frames where each frame includes a synchronization word followed by fixed plurality of data words. Since each recorded frame includes more bits than the originally received data bits per frame, the recording bit rate for each channel is substantially higher than the incoming data bit rate per channel. All frames from the various channels are recorded simultaneously so that the synchronization words from channel to channel are in alignment. During the read-out process, all of the channels are simultaneously read so as to provide a plurality of reconstructed data channels, each including a serial stream of data bits. A decoder is provided for each channel and the various decoders are controlled by a common decoder control circuit. For each channel, the decoder circuit detects the synchronization word and then sequentially stores the data words in designated locations of a read/write memory. After all of the synchronization words in the various channels have been detected, an offset delay takes place before the reading operation commences. This offset delay is sufficient to permit the writing into memory operation to continue within the decoders until one of the decoders has written a specified number of data words into its memory. This is done to compensate for tape skew. Thereafter, all of the memories are simultaneously read in sequence from a given memory location to form reconstructed data frames for each channel. These data frames include only the original data words and no parity or synchronization bits. These frames are then combined into a single output data stream at a bit rate substantially less than that of the original incoming data stream. In addition, the read-out operation provides circuitry for determining whether the data signals obtained from one of the channels recorded on the recording medium has exhibited a signal loss, as from a tape defect. In such case, a change-over circuit will look to a different channel to provide a clock signal for operating the decoder for that channel.

3 Claims, 6 Drawing Figures

APPARATUS AND METHOD FOR RECEIVING DIGITAL DATA AT A FIRST RATE AND OUTPUTTING THE DATA AT A DIFFERENT RATE

This is a division of application Ser. No. 798,187 filed May 18, 1977, now U.S. Pat. No. 4,173,014.

BACKGROUND AND FIELD OF THE INVENTION

The present invention relates to the art of digital data communications and, more particularly, to apparatus and method of converting digital data received at one bit rate and then outputting the data at a different bit rate.

The present invention has particular application wherein data is obtained at rates which are greater than that which can be received in real time by state-of-the-art computers. For example, the present state-of-the-art computers can read or receive data at rates of upwards of 1 million bits per second, but not at data rates on the order of, for example, 20 million bits per second. Image processing systems, for example, use satellites and may generate data at very high data rates, such as 20 million bits per second, and this data cannot be processed in real time by a computer.

It is desirable in such a system to record the data on a suitable recording medium, such as typical magnetic recording tape. This may be done at essentially the same speed as the data is being received. Later, the data may be read out at a transport speed which permits a lower bit rate. Also, it is desirable in such a system that the data be divided from the single channel, as received, into multiple channels and recorded on a multiple channel recording medium. During the read-out process, the data is read from the multiple channels and should be rearranged in the same sequence in which received and then outputted at a desired bit rate for processing by a computer or the like.

In addition to the foregoing, it is also desirable to increase the bit packing density in order to maximize the number of bits recorded per inch on magnetic tape. This may be accomplished by known recording schemes. However, a notable disadvantage in high density bit packing is that bit skew becomes of considerable concern. Skew is defined as the time displacement between two reproduced data bits that were recorded simultaneously on different tracks.

It is also desirable in such a system that during the readout process, circuitry be employed for deriving or reconstructing a clock signal from the bits recorded in an associated recording track. However, if there is a degradation in the signal level of the bits recorded in that track, then this will adversely affect the reconstructed clock rate.

BRIEF STATEMENT OF THE INVENTION

It is an object then of the present invention to provide a system of the nature described thus far wherein circuitry is provided for minimizing bit skew affects.

It is a still further object of the present invention to monitor the signal level of the bits recorded in each track, and, if the signal level is sufficiently degraded, obtain a reconstructed clock signal from the bits recorded in a different track.

It is a still further object of the present invention to provide a random-access memory as a buffer in the writing circuitry to enable the incoming data bits to be clocked at a rate such to allow sync words to be inserted in each frame while still maintaining a continuous output stream of data.

Moreover, it is a still further object of the present invention to adjust for skew by using a random-access memory in the tape read-out circuitry for each channel for storing incoming data from the corresponding tape channel after synchronization has been established for all tracks and then initiating read-out from predetermined locations in the random-access memory after synchronization is established in all channels, with the read-out being clocked into an output shift register which is then clocked at a rate to provide a continuous data output stream with parity and synchronization bits removed.

In accordance with one aspect of the present invention, apparatus is provided for arranging digital data that is provided in a plurality of individual information channels. The data in each of the individual information channels may be skewed in time with respect to corresponding portions of the data in the other information channels. The digital data provided in each channel includes a continuous serial stream of data bits having synchronizing signals periodically included therein; all of the channels include a like number of data bits between successive synchronizing signals. The apparatus for arranging the digital data includes a plurality of processing means which are each associated with a corresponding one of the channels. Each processing means includes a suitable storage device together with means for sensing the occurrence of synchronizing signals in the corresponding channel. The data bits are stored in selected positions in the storage device in accordance with the position of the data bits in the serial stream with respect to the synchronizing signals. Also, means are employed for reading out data from selected positions in each of the storage means associated with each of the processing means in a selected sequence. In this manner, the data is provided in a preselected order independently of any skew occurring between the channels.

In accordance with another aspect of the present invention, apparatus serves to provide a periodic clock signal in timed relationship to digital data being provided along an information channel. This apparatus includes means for deriving a primary timing signal directly from the digital data with the primary timing signal occurring in close timed relationship to the digital data except when the information channel is degraded. An alternate timing signal is derived and this also occurs in timed relationship to the digital data although less closely than the primary timing signal. The amount of degradation in the information channel is determined and a timing control signal is provided having a value corresponding to either the primary timing signal or the alternate timing signal in accordance with the value of the timing control signal. In this manner, the periodic clock signal occurs in timed relationship to the digital data regardless of the amount of degradation of the information channel.

BRIEF DESCRIPTION OF THE DRAWINGS

The foregoing and other objects and advantages of the present invention will become more readily apparent from the following description of a preferred embodiment, as taken in conjunction with the accompanying drawings which are a part hereof, and wherein.

DETAILED DESCRIPTION

Figure 1:
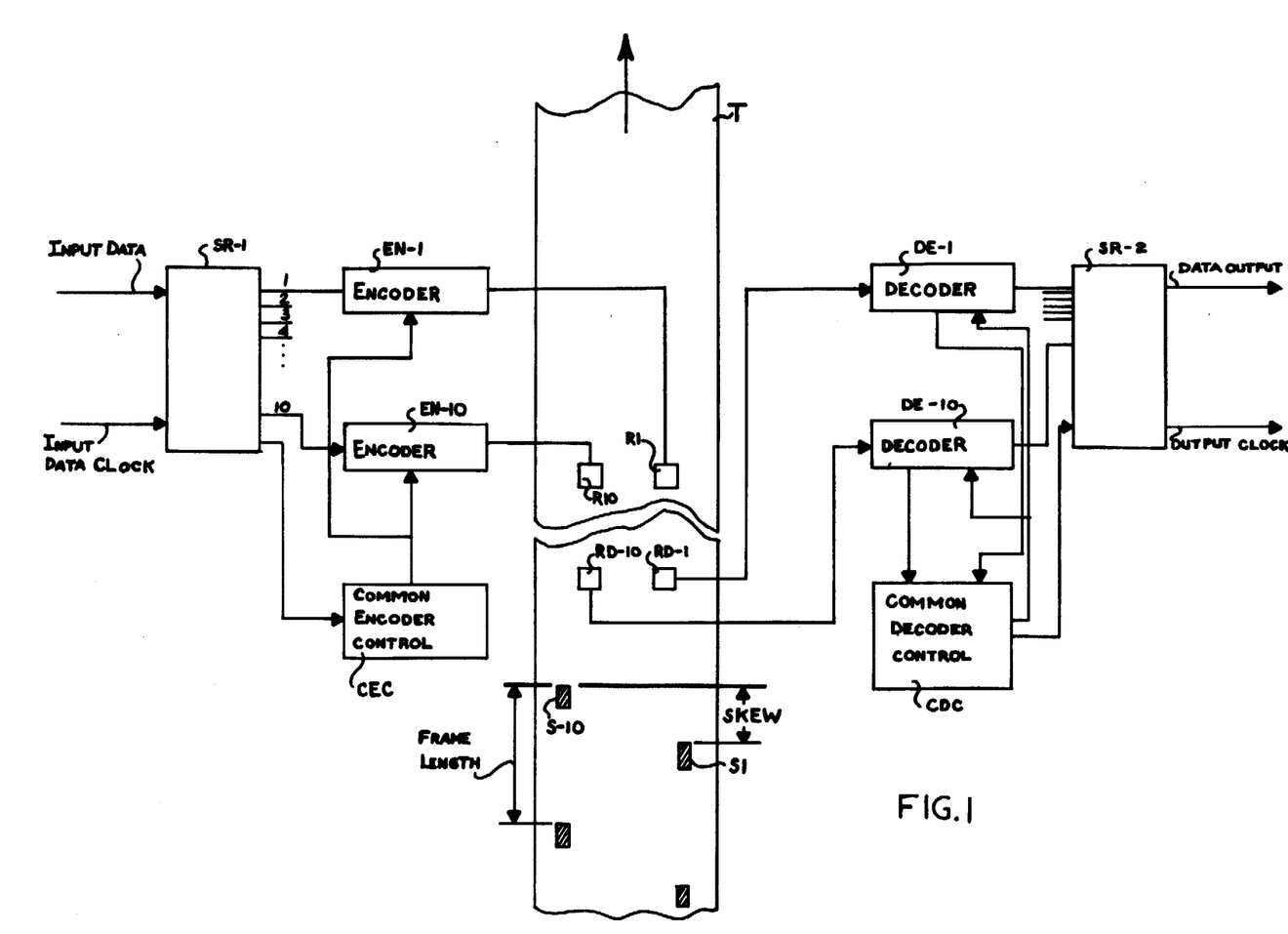
FIG. 1 is a block diagram illustration of the present invention.

Reference is now made to the drawings wherein the showings are for purposes of illustrating a preferred embodiment of the invention only and not for purposes of limiting same. FIG. 1 provides a schematic-block diagram illustration of the system taken as the whole wherein a continuous data stream at a relatively high bit rate, such as on the order of 20 million bits per second, is received and recorded on a suitable magnetic recording tape T and which is subsequently read and then provided at an output as a continuous bit stream of digital data at some other rate, such as something less than 1 million bits per second.

Such a system has application wherein data is obtained at rates which are greater than can be received in real time by state-of-the-art computers. Thus, present state-of-the-art computers can read or receive data at rates of upwards of 1 million bits per second, but not at data rates on the order of, for example, 20 million bits per second. More specifically, image processing systems using satellites may generate data at these very high data rates, and this data cannot be processed in real time by a computer. Consequently then, the data is recorded on a magnetic recording tape such as tape T in FIG. 1 and then read out at a transport speed which permits a lower bit rate.

In the example being given, the input data is clocked into a series input-parallel output shift register SR-1. The shift register is a ten-bit shift register and the stream of data is divided so that of each ten bits, one bit is sent to a different channel for encoding purposes with the data then being recorded in ten channels on the recording tape T. During the reading process, the bits are read from the ten channels and rearranged in the same sequence at which they were received as they are outputted to form an output bit stream. As will be described in greater detail with reference to FIGS. 2-6, the recording process uses encoders EN-1 through EN-10 for the associated channels together with a common encoder control CEC which receives the input data clock from the shift register SR and uses this clock to generate the various timing and controls for operating the encoders. The encoders, in turn, operate suitable magnetic tape recording equipment including combined amplifier recorder heads R1-R10 which are properly positioned on tape T for recording the data in ten different tracks.

The receiving equipment includes a decoder for each channel to decode the information read from its associated track on tape T. Thus, there are ten decoders DE-1 through DE-10 associated with the respective channels and each receives data from its associated magnetic tape reading equipment including read heads RD-1 through RD-10. These are conventional and it is assumed that each includes the appropriate equipment for reading an associated track on tape T to produce an analog signal upon detection of each recorded bit. The analog signals are then transmitted to the associated decoder. The decoders are controlled by a common decoder control circuit CDC. The data bits decoded by decoders DE-1 through DE-10 are then multiplexed back into a serial bit stream by means of a parallel-in series-out shift register SR-2 with the bits being shifted out under control of the common decoder control circuit CDC. The encoders and common encoder control are described in greater detail hereinafter with reference to FIGS. 2 and 3 and the decoders and the common decoder control are described in greater detail hereinafter with reference to FIGS. 4, 5, and 6.

Each data channel is broken into data frames with each frame consisting of 60, 7-bit words for a total of 420 bits. This frame is increased somewhat in length in that a parity bit is added to each 7-bit word to obtain 60, 8-bit words and a 24-bit synchronization word is added. Thus, the frame, as recorded on tape T, includes a total of 504 bits which are recorded in a serial stream. These bits are recorded at a higher bit packing density then that normally employed in recording binary data. Normally, binary data is recorded at saturation levels and this limits the packing density to approximately 1,600 bits per inch (BPI). Consequently then, for an 8-track recording tape the packing density is limited to 12,800 BPI. It is known that packing density may be increased in recording binary data by recording at levels somewhat less than the saturation level. Less flux is required to record each bit and this means that less time and energy is required. Such recording equipment is known in the art together with appropriate reading equipment and, for example, may be obtained from the Honeywell Corporation. Since the bit size is smaller for each bit recorded, more channels can be used for the same size tape. For example, the 8-tracks referred to above could be increased to 20-tracks and the packing density for each track may be increased to 24,000 BPI. Consequently then, on a half inch recording tape, the packing density then may be increased from 12,800 BPI to 480,000 BPI.

There is a notable disadvantage in such high density bit packing; bit skew becomes a considerable concern. Skew may be defined as the time displacement between two reproduced data bits that were recorded simultaneously on different tracks, such as tracks 1 and 10 illustrated in FIG. 1. Skew may be divided between static skew and dynamic skew. Static skew is caused by fixed physical parameters or changes which occur so slowly that they can be considered as fixed. Dynamic skew is the more rapid changes which occur during operation. The parameters which produce static skew in a multiple track machine include head stack placement, gap scatter and head azimuth, and changes in tape dimensions. The parameters which produce dynamic skew are interchannel time displacement error and series time base error.

With reference to FIG. 1, the mark in channel 10 may be considered sync word S-10 which has been recorded in that track and the mark in channel 1 may be considered as sync word S-1 recorded on that track. But for the skew factor, these two sync words should be in alignment. Because of skew parameters outlined above, however, these sync words will be displaced in the longitudinal direction by an unknown amount. As state previously, the skew factor is particularly noticeable when high packing density is employed. Thus, essentially 15 bits are now recorded in the same area as one bit previously (when the previous 8-track recording density is 1,600 BPI). Therefore, as the tape T is stretched and otherwise subjected to mechanical variations, or as the locations of the read heads or the write heads are off somewhat, the skew factor increases. The skew may be as high, for example, as 100 bits.

Because skew is both dynamic and static components, as discussed above, the manner in which the data is collated from all of the tracks in accordance with the present invention, is to insert synchronization information, such as sync words S-1 and S-10, at definite known intervals. Moreover, the frame length for each channel is chosen so as to exceed the maximum skew which is likely to occur. Since the skew may be on the order of 100 bits in the example given here, a recorded frame length of 504 bits is well beyond the anticipated maximum skew. The sync words added to the ten channels are employed by the decoding electronics to minimize any adverse affect of skew.

Within each decoder, circuitry is employed for purposes of deriving or reconstructing a clock signal from the bits recorded in the associated track. However, if there is a degradation in the signal level of the bits recorded in that track, then this will adversely affect the reconstructed clock rate. For this reason, each decoder employs circuitry for monitoring the signal level of the bits recorded in the associated track and if the signal level is sufficiently degraded, the decoder will obtain a reconstructed clock signal from one of the other decoders in the read-out circuitry. This is explained in greater detail with reference to FIGS. 4 and 5.

Figure 2:
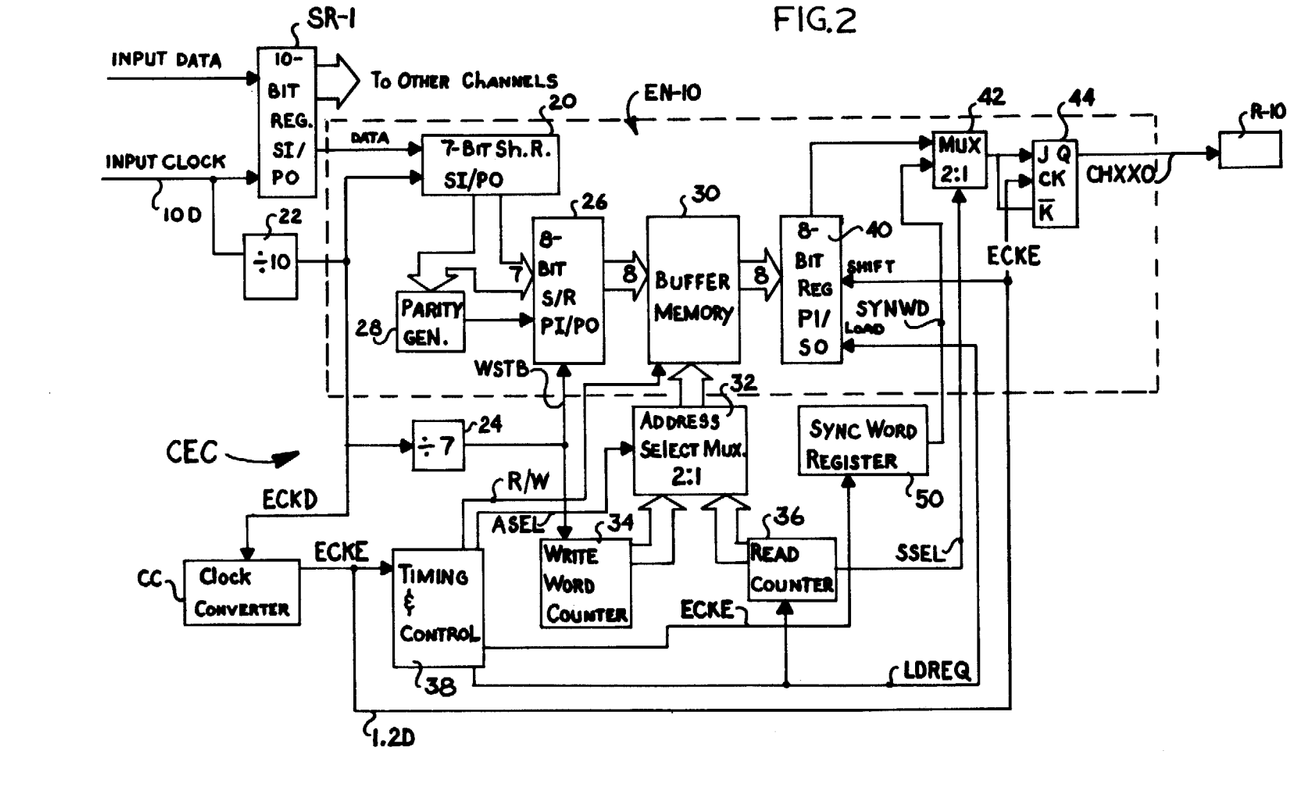
FIG. 2 is a schematic-block diagram illustration of the encoder circuitry employed in the present invention.
Figure 3:
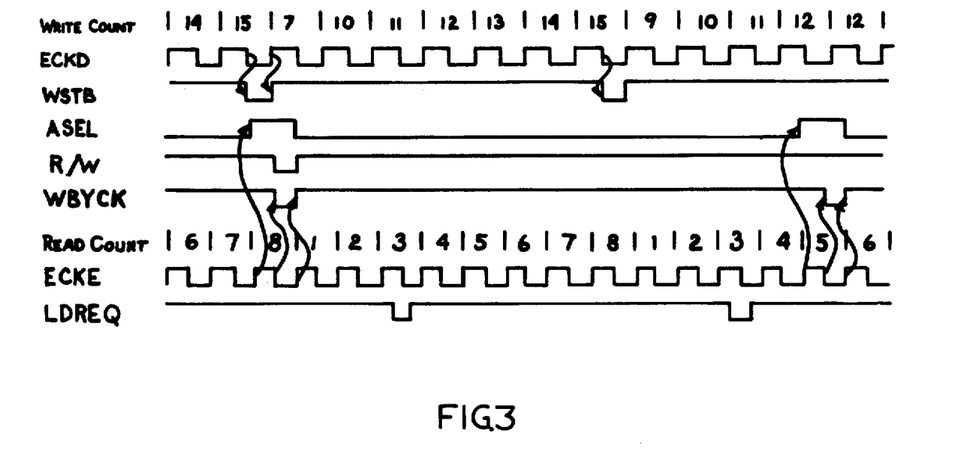
FIG. 3 includes a plurality of waveforms representative of various aspects of the operation of the circuitry of FIG. 2.

Having now briefly described the system with reference to FIG. 1, attention is now directed to FIGS. 2 and 3 for a detailed description of the encoder circuits. This is then followed with a detailed description with reference to FIGS. 4, 5, and 6 relative to the decoder circuits.

ENCODER CIRCUITRY

Reference is now made to FIG. 2 as well as to the waveforms of FIG. 3 for a detailed description of the encoder circuitry together with the common encoder control. The encoder circuitry illustrated is that for encoder EN-10, it being understood that the circuitry be employed in encoders EN-1 through EN-9 are identical.

The shift register SR-1 receives input data as a continuous stream of digital data at a rate which may be as high as on the order of 20 million bits per second. This then establishes the rate of the input clock applied to the shift register. This clock rate will be referred to hereinafter as clock rate 10D. The shift register SR-1 is a series-in parallel-out shift register and, hence, bit position 10 (for channel 10) receives one bit for each ten input clock pulses at a rate of 10D. Consequently then, bit position 10 may be shifted out and loaded into a series in-parallel output shift register 20 within the encoder EN-10 at a rate of one-tenth the input clock rate. For this reason, the input clock is supplied to a divide-by-ten circuit 22 so as to obtain a clock rate of 1.0D and this is used as the shift clock pulses to the shift input register 20. This clock will be referred to hereinafter as the encoder data clock ECKD or sometimes referred to as the NOT encoded data clock $\overline{ECKD}$. The encoder data clock has a clock rate of one-tenth the rate of the input data stream. Each data bit from the position 10 of shift register SR-1 is shifted in series into the 7-bit series in-parallel output shift register 20 at the encoder data clock rate. This takes place in each of the other encoders. A divide-by-seven circuit 24 in the common encoder control CEC provides a write strobe signal WSTB each time seven encoder data clock pulses ECKD have been counted. This is used to actuate the load input of a parallel input, parallel output 8-bit shift register 26. At this time, shift register 26 receives the seven bits previously loaded in the shift register 20 together with a parity bit, in the least significant bit position, from parity generator 28. The parity generator operates in a conventional fashion and examines the seven bits in the shift register 20 and makes a parity decision and then provides a parity bit of either a binary "1" or a binary "0" level in a known manner. Upon actuation of the load input of register 26 by the write strobe signal WSTB, the parity bit as well as the seven data bits in register 20 are loaded into the 8-bit register 26. This now constitutes an 8-bit word which may now be written into a buffer memory 30.

Preferably, the buffer memory takes the form of a conventional random-access memory and, for example, is capable of loading 8-bit words and has a word capacity on the order of 63 words. As is conventional, a write operation requires that a read/write line R/W be low (see FIG. 3) for a writing operation and be high for a reading operation. The address at which the read or write operation takes place is obtained by way of an address select multiplexer 32. This multiplexer provides addresses from either a write word counter 34 or from a read counter 36 under the control of an address select ASEL gating signal. When the address select line ASEL is high, the write counter 34 provides the address through the address select multiplexer 32 to the memory 30. When the address select signal ASEL is low, then the count in the read counter 36 is provided through the multiplexer 32 to provide the address for the memory 30. The address select signal ASEL and the read/write signal R/W are obtained from a timing and control circuit 38 which provides these signals in a manner to be discussed hereinafter with reference to the waveforms of FIG. 3. Each time the read/write line R/W is low, an 8-bit word in register 26 is loaded into memory 30 at an address obtained from the write counter 34.

During a read operation, the timing and control circuit 38 lowers its load request line LDERQ. This actuates the load input of a parallel-in series-out shift register 40 so as to receive an 8-bit word from the buffer memory 30. However, this also requires that the read/write line R/W be raised so as to provide a read function. Also, the address select line ASEL must be low in order for the read address to be obtained from the read counter 36 by way of the multiplexer 32. The properly addressed location in the memory will provide an 8-bit word which will be loaded in parallel into the parallel input-series output shift register 40. When the load request line LDREQ is again raised, it actuates the register 40 to a series output shift operation permitting the 8-bit word previously stored to be shifted out in bit serial fashion by clock pulses applied to the shift input of the register and at a rate in accordance with those clock pulses. These are the encoded clock pulses ECKE which are provided by a clock converter CC and have a clock rate of 1.2D where D is the data clock rate at which data was originally shifted into the seven digit register 20. This difference in clock rates will be discussed in greater detail below.

As the 8-bit word in register 40 is being shifted in bit serial fashion out of the register, it is supplied through a multiplexer 42 under the control of a sync select line SSEL and, thence, is gated through a JK flip-flop 44 at the rate of the encoded clock pulses ECKE.

From the discussion given thus far, it is apparent that an incoming data frame applied to the shift register 20 is defined as 60, 7-bit words for a total of 420 bits. A parity bit is added to each seven-bit word and the data outputted from the flip-flop 44 also includes a 24 bit sync word. This provides a total of 504 bits that must be outputted from the flip-flop 44 during the same time period as 420 bits are being received by register 20. This then requires that the encoder data clock ECKD be increased from the rate of 1D to a rate of 1.2D in order to provide a faster clock for processing the data. The 1.2D rate is the ratio of 504 bits to 420 bits. This increased rate is obtained by the clock converter CC which receives the encoded clock pulses ECKD at a rate of 1.0D and through a conventional phase lock loop increases the frequency to obtain encoded clock pulses ECKE at a rate of 1.2D. The clock converter conventionally includes a phase lock loop, employing a phase comparator for receiving a clock signal at a given clock rate and then providing an output voltage in the form of an error signal which is used to drive a voltage controlled oscillator. The voltage controlled oscillator provides an output signal at a frequency dependent upon the magnitude of the error voltage. This output signal is then fed back to the phase comparator through a frequency dividing circuit so that the two inputs to the phase comparator circuit become phase locked, causing the error voltage of the comparator to be the exact voltage required for the voltage controlled oscillator to produce the desired clock rate. In this case, the encoded clock signal ECKE is at a clock rate of 1.2D. This clock signal is supplied to the timing control circuit 38 from which (see FIG. 3) there is derived a read/write signal R/W, an address select signal ASEL, and a load request signal LDREQ.

The sync word for each channel is a unique 24-bit word and is preset into a sync word register 50. This register will shift the sync word out in a series stream when clocked by the encoded clock signal ECKE at the encoded rate of 1.2D. The 24 bit stream known as the sync word SYNWD is applied through a multiplexer 42 when a sync select line SSEL is raised. As will be discussed later, this is raised during certain counts by the counter 36.

The write counter 34 counts 60 words from 0 to 59 and the read counter 36 counts from 0 through 62 (only 63 words are used in the buffer memory). However, the two counters are clocked at different rates. The write counter 34 is clocked from the divide-by-seven circuit 24 so that it is up-dated at a rate one-seventh that of the encoder data clock ECKD which is at a rate of 1.0D. The read counter 36 is incremented each time the load request line LDREQ is lowered by the timing and control circuit 38. This is produced at a rate one-eighth that of the encoded clock signal ECKE which is operating at a clock rate of 1.2D. The actual time of occurrence of lowering the load request line is preferably midway during an encoded clock pulse ECKE as can be seen in the waveforms of FIG. 3. Thus, midway into the third bit of a bit train extending from bits 1–8 of the encoded clock ECKE, the timing and control circuit 38 lowers the load request line. The write strobe WSTB is outputted from the divide-by-seven counter 24 to increment the write word counter 34. The write addresses corresponding with counts 0, 1, and 2 are dummy addresses and counter 34 counts only 3 through 62 and recycles.

The read counter 36 counts a total of 63 words, three words being reserved for the sync word at counts 0, 1, and 2 and the 60 data words in sequence being count words 3–62. Thus, when the read counter 36 is incremented to a count 3, it is addressing that first data word stored in the buffer memory 30 and at a count of 62, it addresses the last or 60th data word. During counts 0, 1, and 2 of the read counter 36, the sync select line SSEL is raised and this actuates the multiplexer 42 so that is passes only the sync word SYNWD which is clocked through by the encoded clock pulses ECKE at the encoded clock rate of 1.2D. The encoded clock pulses ECKE are also supplied to the clock input of a JK flip-flop 44 so that the pulses will be clocked on all data channels in synchronism to thereby insure that the bits in the ten channels are recorded essentially simultaneously. Once the sync word has been clocked through the multiplexer, the sync select line SSEL is lowered and the multiplexer 42 passes only data words which are shifted out of the register 40 by the encoded clock pulses ECKE at the encoded rate 1.2D.

DECODER CIRCUITRY

Figure 4:
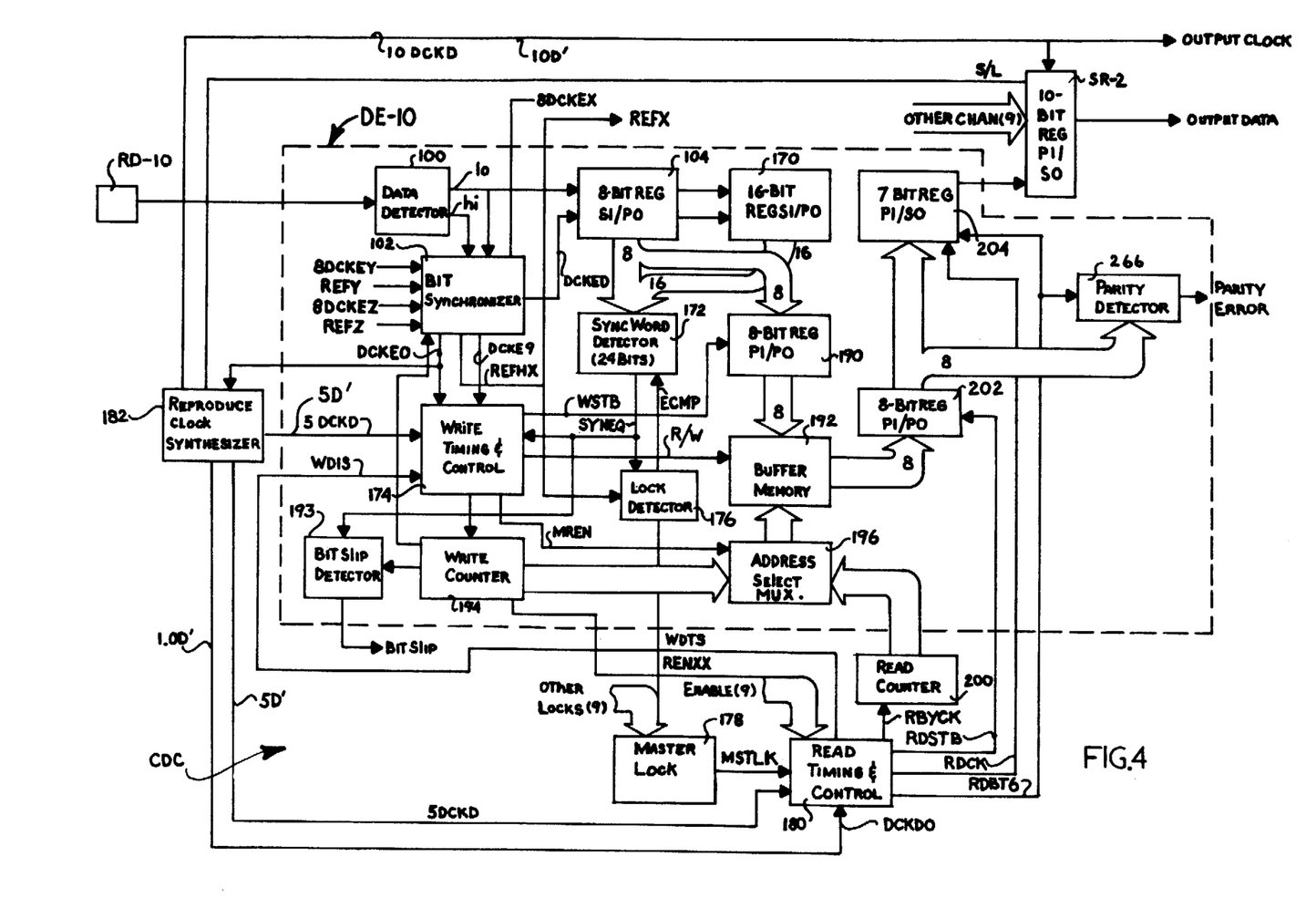
FIG. 4 is a schematic-block diagram illustration of the decoder circuitry employed in the present invention.
Figure 5:
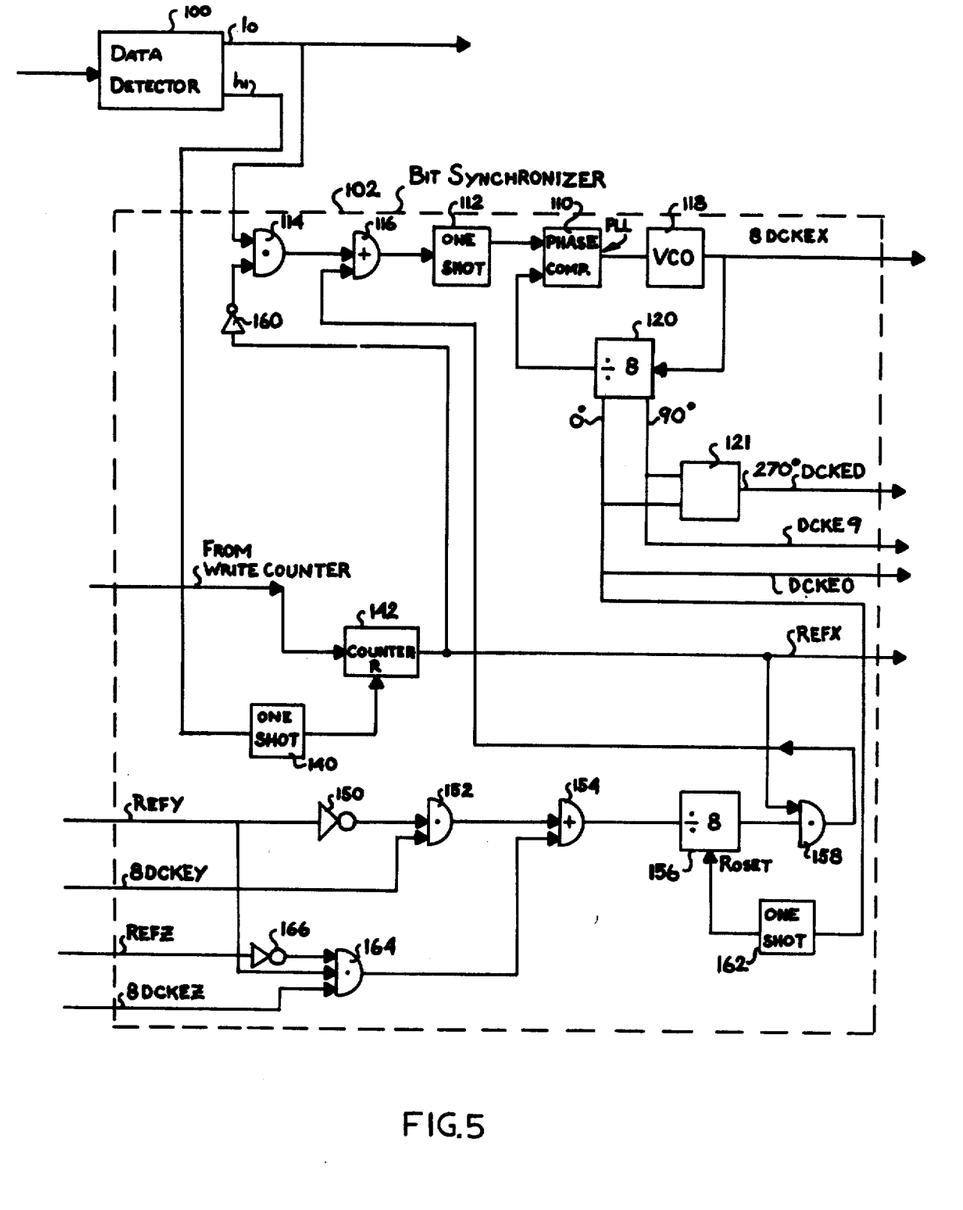
FIG. 5 is a schematic-block diagram illustration of a bit synchronization circuit employed in the present invention; and, FIG. 6 includes a plurality of waveforms illustrating various aspects of operation of the circuitry shown in FIGS. 4 and 5.
Figure 6:
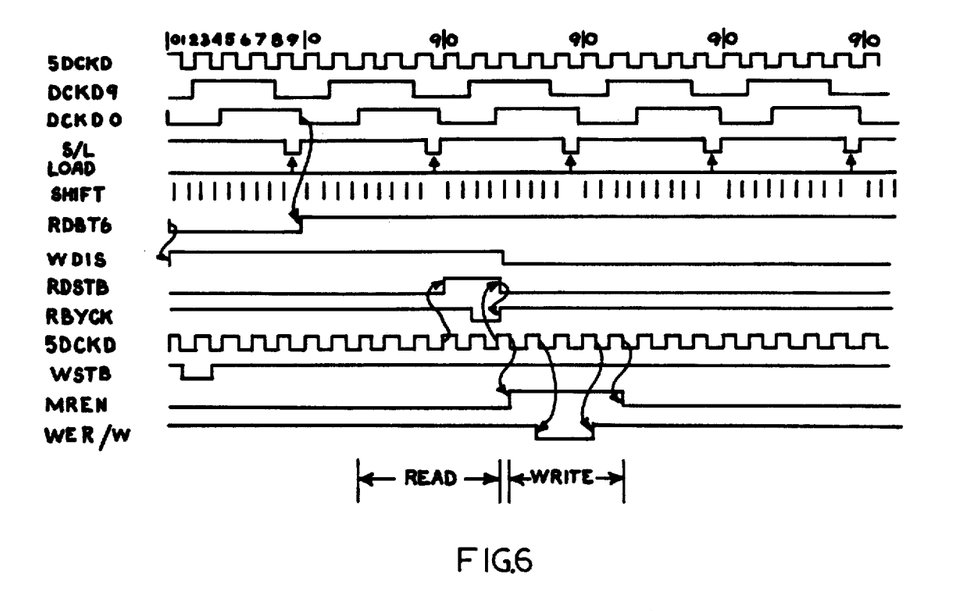

Reference is now made to FIGS. 4, 5, and 6 for a detailed description of the decoder circuitry. In FIG. 4 there is illustrated the decoder circuitry for decoder DE-10 (it being understood that the other decoders DE-1 through DE-9 are identical), together with the circuitry constituting the common decoder control CDC (see FIG. 1). The decoder circuitry serves to obtain data from its associated channel read head, such as read head RD-10 for channel 10, recover the clock rate from the data being received, remove the parity bits and the synchronization word and output the data by way of the output shift register SR-2. The circuitry within the dotted line of FIG. 4 constitutes the circuitry within the decoder DC-10 and the remaining circuitry in this FIGURE is the common decoder control CDC (FIG. 1).

The data obtained from the read head as the tape is being moved by its transport system is supplied through a data detector 100. The output of the detection is provided in an NRZ-L (non-return to zero) format. This may take the form of a conventional data detector circuit and in the present case, includes both a low threshold detector as well as a high threshold detector. Each bit is examined and those that have a magnitude exceeding the high threshold are supplied only to a bit synchronizer circuit 102, whereas those that exceed the low threshold are supplied to both the bit synchronizer circuit 102 as well as to an 8-bit series in-parallel out shift register 104. The low data bits are clocked into the series in-parallel output shift register 104 under control of a decoded clock DCKED which is obtained from the bit synchronizer 102. Before continuing with the description of FIG. 4, attention is now directed to the bit synchronizer 102 which is illustrated in greater detail in FIG. 5.

The bit synchronizer 102 (FIG. 5) uses the low data pulses to generate the decoded clock DCKED discussed above as well as additional clocks DCKE0, DCKE9, and 8DCKEX. These various clocks are used in the description which follows relative to the remaining portions of FIG. 4. The bit synchronizer employs a phase lock loop PLL to generate the clock pulses discussed above. The phase lock loop includes a phase comparator 110 which receives pulses from a one-shot circuit 112. The one-shot circuit is, in turn, fed by the threshold transitions from the low data bit pulse train from the data detector circuit 100. Thus, each pulse transition which exceeds the low threshold is supplied through an enabled AND gate 114 and thence through an OR gate 116 to trigger the one-shot circuit 112. The pulses received by the phase comparator from the one-shot circuit 112 provide an error signal on the output of the phase comparator and this is of a voltage level which causes the voltage controlled oscillator 118 to produce a train of pulses referred to as clock pulses 8DCKEX. The output of the voltage controlled oscillator 118 is supplied to a divide-by-eight counter 120 which divides the outputted clock rate by a factor of eight and supplies this to the second input of the phase comparator 110. The phase comparator then develops an error signal in accordance with any phase difference between pulses supplied by the one-shot 112 and the pulses obtained from the divider circuit 120. This error signal is thus driven so as to be at a voltage necessary for the voltage controlled oscillator to produce the desired clock rate; in this case, eight times the input clock rate. The divide-by-eight counter is used to provide clock pulses DCKE0 at a zero degrees phase and clock pulses DCKE9 at a 90° phase. These two outputs of the divider may be combined by combiner 121 so as to obtain a 270° phase clock signal DCKED.

The bit synchronizer circuit 102 also includes hand-over circuitry which is illustrated in the lower portion of FIG. 5. The bit synchronizer uses the low threshold signal to recover the clock so long as the high threshold signal is active. However, when the high threshold signal falls below its trigger level due to a tape flaw or the like, a channel change-over takes place in that the bit synchronizer will use an eight times clock from one of two adjacent channels. This function is accomplished by the circuitry in the lower portion of FIG. 5. The high threshold output of the data detector takes the form of threshold crossings and these crossings or pulses are supplied to a one-shot circuit 140. The one-shot circuit serves to shape the pulses and supply them to the reset input of a resettable counter 142. This counter receives a count input signal from the write counter in the decoder circuit (FIG. 4) with each count signal taking place once for each 8-bits of data obtained from the low threshold output of the data detector. The counter counts to a total count of three, unless it has been reset by the one-shot circuit 140 which produces a reset pulse each time the bit level is in excess of the high threshold level. In the case of a bad tape flaw or the like, the threshold may not be passed for a total of 24 data bits or three counts on the write counter and this will cause counter 142 to produce a NOT reference high signal and thereby raise the signal level on its output line REFX. This signals the hand-over circuitry that a tape flaw has taken place in the channel associated with that decoder. This also indicates that the clock derived by that decoder may not be proper and, hence, the circuit should not rely on the clock pulses supplied by the low output of the data detector to the phase comparator 110. Transfer is now made to one of the adjacent channels.

The two adjacent channels may be considered as the Y channel and the Z channel for this discussion. The Y channel also produces a NOT reference high on its ouput REFY as well as a Y channel eight times clock signal 8DCKEY. Also, the other channel provides similar inputs to the bit synchronizer in the form of a NOT reference high signal REFZ and an eight times clock signal 8DCKEZ. The preferred substitute clock is that taken from the Y channel and, hence, the preferred clock is 8DCKEY. If the Y channel has not raised its NOT reference high line REFY, then this binary "0" level is inverted by an invertor 150 and a binary "1" signal is supplied to enable an AND gate 152. This permits the eight times clock pulses from channel Y to be clocked through the AND gate 152 and, thence, through an OR gate 154. These clock pulses are then divided by a divide-by-eight counter 156 so as to obtain a one times clock pulse train which is then supplied through an AND gate 158. This AND gate is enabled whenever the REFX line is raised by counter 142. The clock pulses passed by the AND gate 158 are now supplied through OR gate 116 to the one-shot circuit 112. If the REFX line is raised, it will disable AND gate 114 by supplying a binary "1" signal by means of invertor 160 to disable AND gate 114. To maintain the operation in synchronism, the phase zero output of the divide-by-eight counter 120 is supplied through an one-shot circuit 162 to the reset input of the divide-by-eight counter 156 in the hand-over circuit. In the event that a tape flaw or the like caused the REFY line to be raised, then the hand-over circuit would look to the next channel clock. Thus, if the REFY line is raised, this would enable AND gate 164 and if the REFZ line is not raised, then an invertor gate 166 would supply a binary "1" signal to the AND gate to thereby pass the eight times Z clock pulses 8DCKEZ through the AND gate 164 and, thence, through OR gate 154 to the divide-by-eight counter 156.

The data taken from the low threshold output of the data detector 100 is clocked into series connected shift registers 104 and 170 by the decoded clock pulses DCKED. These pulses exhibit a clock rate which may be considered as 1.2D′. The clock rate of 1.2D at which the encoder shifted pulses through the JK flip-flop 44 (FIG. 2) is not equal to the clock rate 1.2D′ at which pulses are shifted into registers 104 and 170. Thus, it will be recalled that a computer cannot receive in real time a data stream exhibiting a clock rate on the order of 20 million bits per second, but is limited to some lower clock rate such as on the order of less than 1 million bits per second. The rate D′ may be proportional to the rate D and is substantially less. The actual value of rate D′ depends largely upon the transport speed at which the tape is being driven during the read operation.

Registers 104 and 170 are respectfully 8-bit and 16-bit series in-parallel output shift registers. Together they comprise what may be considered as a 24-bit series in-parallel output shift register. Data is clocked into these registers until the registers are occupied by the 24-bit sync word and this is detected by a sync word detector 172. Such a detection is designated by the sync word detector raising its SYNEQ line. This signals that the sync word has been detected and the signal is applied to a write timing and control circuit 174 and to a lock detector 176. The lock detector is a counting circuit and requires that four sync words be detected and then the lock detector provides an output designating this to a master lock detector 178 located in the common decoder control circuit CDC. After detection of the first sync word, the lock detector provides a window of 29 bits in duration such that the window takes place at the anticipated time of reoccurrence of a 24 bit sync word. When all of the lock detectors in all of the decoders have detected four sync words, then the master lock detector 178 produces a master lock signal MSTLK which is applied to a common read timing and control circuit 180. The read timing and control circuit, in turn, has an output circuit which normally carries a write disable signal which disables the write function in all of the channel decoder circuits. In addition, the read timing and control circuit provides read control signals including a read byte clock RBYCK, a read strobe signal RDSTB, a read clock signal RDCK, and a read bit clock RDBT6. These are all generated based on a five times clock signal 5DCKD and a clock signal DCKDO, both applied to the read timing and control circuit 180 from a reproduce clock synthesizer circuit 182.

The synthesizer circuit 180 receives the clock signal DCKEO from the bit synchronizer circuit 102 to generate various clocks. It will be recalled that the bit synchronizer developed the clock signal DCKEO from the bit stream detected by the data detector 100. Consequently then, we can consider that this clock corresponds to 1.2D' where D' differs from D (in the encoder) dependent upon the transport speed. The synthesizer converts the 1.2D' clock rate to a 1.0D' clock rate (in the form of data clock DCKDO), or a five times data clock 5DCKD, or a ten times clock 10DCKD. The five times clock 5DCKD as mentioned previously, is supplied to the read timing and control circuit 180 and is also supplied to the write timing and control circuit 174 within the channel decoder. The ten times clock 10DCKD is supplied as a shift clock for the output shift register SR-2.

Within the decoder circuit, the write timing and control circuit 174 uses clock signals DCKE0 and DCKE9 obtained from the bit synchronizer 102, the five times data clock rate signal 5DCKD obtained from the synthesizer 182, the write disable signal WDIS obtained from the read timing and control circuit 180, and the synchronization detection signal SYNEQ obtained from the sync word detector 172. From these inputs the write timing and control circuit provides various write control signals. Reference should be made to FIG. 6, and particularly the lower portion thereof to see the manner in which these various signals are derived.

The write timing and control circuit provides a write strobe signal WSTB which is supplied to an 8-bit parallel input-parallel output shift register 190 so that the first word after detection of a sync word will be loaded into the shift register 190, thereby supplying the data word to be loaded into a particular address of a buffer memory 192. The address at which the data word is loaded is obtained from a write counter 194 through an address select multiplexer 196 which passes the count from the write counter when a memory read line MREN is raised (see FIG. 6) by the write timing and control circuit 174. The write counter 194 is incremented by the write timing and control circuit 174 each time a write operation is conducted and the counter is used to provide a total of 60 counts each being one of the 60 addresses in the frame of data being received from the tape.

The multiplexer 196 supplies the address in the write counter 194 to the memory 192 only when the write timing and control circuit raises its memory read enable line MREN (see FIG. 6). Also, the data obtained from register 190 will only be written into this address in the memory when the write timing and control circuit 174 lowers its read/write line R/W; this takes place only during the period that the memory read enable line is raised (see the timing chart of FIG. 6). From the foregoing then, it is seen that after a sync word has been detected, an operation will commence so that the next word following the sync work will be strobed into the parallel input-parallel output shift register 190 and then written into the memory 192 when the read/write line R/W is low and the address at which the data word is written into is obtained from the write counter 194.

The memory 192 is preferably a random-access memory and, for example, is capable of storing 63, 8-bit words received from register 190. The write counter supplies addresses to the memory such that the three sync words are stored in word locations 0, 1, and 2 and then the 60 data words that follow are stored in word locations 3–62. Also, the write counter supplies a window signal to a bit slip detector during counts 0, 1, and 2. If the SENEQ word and the window signal are not coexistent during this period, then this is an indication that there may be one or more bits out of alignment. In such case, the bit slip detector raises its BIT SLIP line to provide a bit slip indication, such as to a computer receiving the output data stream.

The read operation of memory 192 in order to output data by way of register SR-2, will take place after the lock detector 176 in each channel has detected four successive sync words. The sync words are detected and this is indicated to the lock detector 176 when the sync detection line SYNEQ is raised. The lock detector circuit 176 includes counting circuits so as to count the four sync word detections. Once this has taken place, the lock detector provides an indication on its output to the master lock detector 178. Once all of the lock detectors have provided this signal, then the master lock detector 178 raises its master lock line MSTLK which is supplied to the timing and control circuit 180. Before read operation takes place, however, the read timing and control circuit 180 awaits a read enable signal RENXX from one of the channel write counters 194. This signal is provided by the first write counter in the various channel decoders to reach a specific count after the master lock signal takes place. The purpose of this delay function is to compensate for both static and dynamic skew so that the data can then be reassembled into a proper serial data stream.

As will be recalled from the discussion with reference to FIG. 1, the sync words may be out of skew from each other. In the example being given, it has been determined that the maximum skew throughout the ten channels will be on the order of 100 data bits. Consequently then, this factor must be taken into consideration in providing offset compensation for skew. Also, other factors in determining the offset must be considered. This includes the three sync words for a total of 24 bits together with 60 parity bits.

The offset required must consider a maximum skew of 100 bits (12.5 bytes), 60 bits of parity and 24 for sync words (a total of 10.5 bytes). In addition, the first word data is located at address 3. Also, it is preferable to provide some centering in determining the offset. Consequently, in the example being given, the offset selected is a write count of 50. By this it is meant that after the master lock detector signal MSTLK is provided, the read timing and control will wait until one of the write counters 194 in the various channel decoders reaches a write count of 50. The first write counter to obtain this count will provide a read enable signal RENXX to the read timing and control circuit 180. The read timing and control circuit will now provide read signals and control signals. These include a read byte clock RBYCK supplied to a read counter 200 located in the common decoder control CDC, a read strobe signal supplied to a parallel input-parallel output 8-bit shift register 202, a read clock signal RDCK supplied to a 7-bit parallel input-serial output shift register 204, and a load control signal RDBT 6 supplied to the parallel input-serial output shift register 204 and to a parity detector 206. The read counter is initialized so that the first address provided is the first data address or location 3.

The counter 200 counts a total of 60 counts, i.e., from count 3 to count 62 and then recycles. The read counter is common to all of the decoders and, hence, all channel memories 192 are simultaneously addressed. Since the memory read enable line MREN is now low, the memory address select multiplexer 196 will pass the counts supplied to the read counter 200. The first count, i.e., memory address 3, is supplied to the multiplexer to address the third word location in the buffer memory 192. This is the first data word in the memory. At this time, the read/write line R/W is high permitting a read operation to take place. (See the waveforms in FIG. 6). Consequently, the first data word is read out of the buffer memory 192. It will be loaded into the parallel input-parallel output shift register 202. From the waveforms of FIG. 6 it will be noted that the contents of this register are shifted out of the register by a read strobe signal RDSTB before the read byte clock signal RBYCK indexes the read counter 200. The data word loaded into the shift register 202 is supplied to a parity detector 206 which examines the parity bit and provides a parity error signal dependent on the examination. This is conventional in the art. In addition, the 8-bit word in the register 202 is supplied to a 7-bit parallel input-parallel output register 204 in such a manner that the parity bit is lost. This then provides only seven bits of data into the register 204. Thereafter, the 7-bit word is clocked out in series by the data clock pulses RDCK at a rate of 1D' so that the seven bits are shifted into the output parallel input-series output shift register SR-2. This register is loaded in parallel from the ten channels whenever the shift line S-L is low (see FIG. 6). Thereafter, when the shift line S-L is raised, the data stored in the shift register SR-2 is clocked out in series by the ten times clock pulses 10DCKD at a rate of 10D'.

Although the invention as been described in conjunction with a preferred embodiment, it is to be appreciated that the invention is not limited thereto as various modifications may occur within the spirit and scope of the appended claims.

What is claimed is:

1. Apparatus for providing a periodic clock signal in timed relation to digital data being provided along a first information channel, comprising:

means for deriving a primary timing signal directly from said digital data, said primary timing signal occurring in close timed relation to said digital data except when said information channel is degraded;

means for deriving an alternate timing signal also occurring in timed relation to said digital data, though less closely than said primary timing signal;

means for determining whether the degradation exceeds a predetermined amount in said information channel and for providing a timing control signal in accordance therewith; and,     means for providing said periodic clock signal having timing corresponding to either said primary timing signal or said alternate timing signal in dependence upon said timing control signal whereby said periodic clock signal occurs in timed relation to said digital data regardless of the amount of degradation of said information channel.

2. Apparatus as set forth in claim 1, wherein digital data is also provided along at least a second information channel in addition to said first information channel, wherein said first and second channels have related timing, and wherein said means for deriving an alternate timing signal includes means for deriving said alternate timing signal from said second information channel.

3. Apparatus as set forth in claim 1, wherein said means for providing said periodic clock signal comprises phase locked loop means synchronized to either said primary timing signal or said alternate timing signal in dependence upon said timing control signal.

* * * * *